United States Patent [19]

Ohtani

[11] Patent Number: 5,905,840
[45] Date of Patent: May 18, 1999

[54] METHOD AND APPARATUS FOR RECORDING AND PLAYING BACK DIGITAL VIDEO SIGNAL

[75] Inventor: Minoru Ohtani, Kanagawa-ken, Japan

[73] Assignee: Victor Company of Japan, Ltd., Yokohama, Japan

[21] Appl. No.: 09/019,638

[22] Filed: Feb. 6, 1998

[51] Int. Cl.$^6$ .................................................... H04N 5/92
[52] U.S. Cl. ............................. 386/44; 386/131; 386/112
[58] Field of Search ............................. 386/46, 111, 112, 386/109, 131, 124, 1, 33, 37, 40, 47, 44; H04N 5/91, 5/92

[56] References Cited

U.S. PATENT DOCUMENTS 5,677,981  10/1997  Kato et al. ............................. 386/131
5,699,475  12/1997  Oguro et al. ............................. 386/112

OTHER PUBLICATIONS

""DVC" Standards for Consumer–Use Digital VCRs": National Technical Report vol. 41 No. 2 Apr. 1995 P48–55 (Japan).

Primary Examiner—Huy T. Nguyen
Attorney, Agent, or Firm—Michael N. Meller

[57] ABSTRACT

A digital video signal recording/playback system and method is provided wherein, when recording/playing back on/from a recording medium, the amount of video data it is possible to record can be increased by making effective use of otherwise unused areas within the basic unit of data on which signal processing is performed.

6 Claims, 3 Drawing Sheets

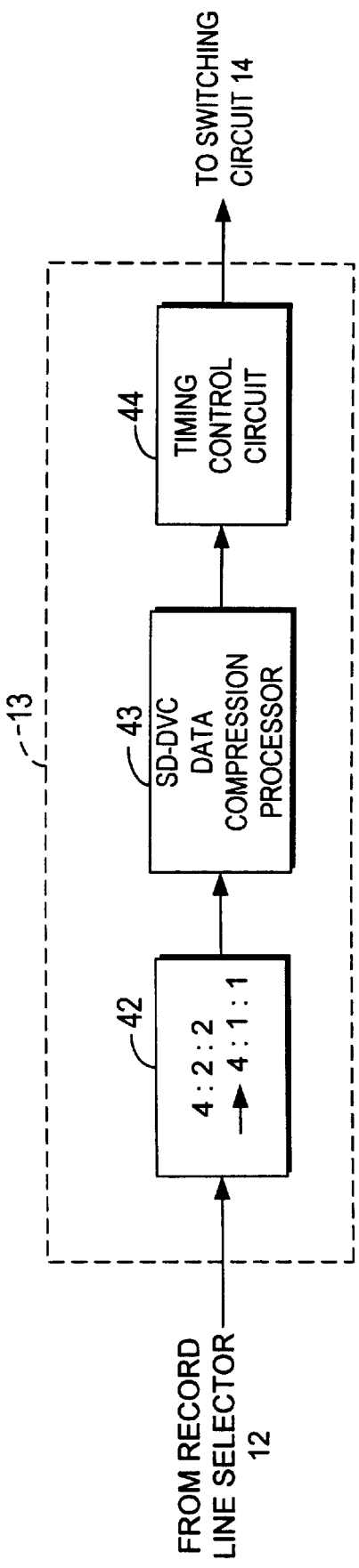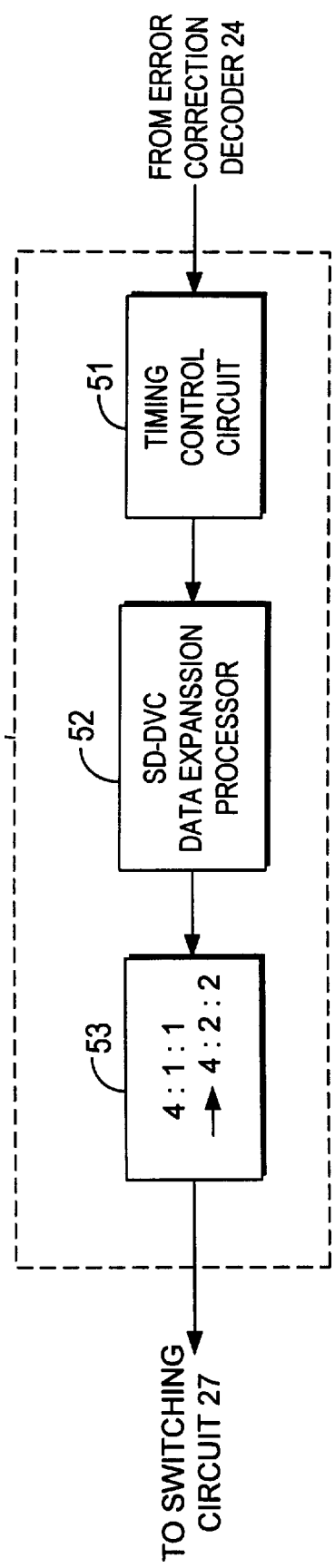
FIG. 2(a)
FIG. 2(b)

METHOD AND APPARATUS FOR RECORDING AND PLAYING BACK DIGITAL VIDEO SIGNAL

The present invention relates to a digital video signal recording and playing back method and system. More particularly, the present invention relates to a digital video signal recording and playback method and system for recording and playing back a data-compressed video signal (picture signal) consisting of a luminance signal and two chrominance signals.

BACKGROUND OF THE INVENTION

"DVC" standards offer standards for digital VTRs (video tape recorders) for data compression and recording of video data (see, for example, pages 48–55 of the *National Technical Report*, Vol. 41, No. Apr. 2, 1995). One such DVC standard is the SD-DVC standard for the recording of video signals having normal broadcast-level resolution (SD signals).

According to this standard, in the so-called 525/60 format (a format equivalent to the NTSC signal format), the video signal is sampled at a 4:1:1 sampling ratio (One Cb sample and one Cr sample for every four Y samples). The luminance (Y) signal has 720 active picture elements ("pels" or "pixels") in the horizontal direction and 480 active lines per frame in the vertical direction. With this sampling ratio, the chrominance signals (Cb and Cr), have 180 active pels in the horizontal direction, but in the vertical direction, they have the same 480 active lines per frame as the luminance signal.

FIG. 3($a$) illustrates the structure of a basic unit of data, for processing purposes, formatted according to the SD-DVC standard. As shown in this figure, a basic data unit is made up of four luminance signal blocks Y0–Y3 and two chrominance blocks Cb and Cr. Each of these basic blocks is made up of coded data developed by taking the coefficient data obtained by performing discrete cosine transformation (DCT) of the sampled data in 8×8-pel units, and performing optimum quantization by code volume control, and variable length coding (VLC) on this coefficient data.

Each of the blocks in FIG. 3($a$) (Y0, Y1, Y3, Cr, and Cb) is made up of a "D" area and an "A" area. The "D" areas (D0–D5) contain data for the dc (direct current) component of each block after DCT-transformation, as well as ancillary data for encoding and decoding. The "A" areas (A0–A5) contain data for the ac (alternating current) components of each block. The A0–A5 areas, however, are not necessarily used separately. Area A0, for example, might be able to hold all of the ac component data for block Y0 and still have some empty space left over, while block Y2 may have more ac component data than will fit into area A2. In this situation, the block Y2 data overflow would be packed into the empty space in area A0.

Also, another standard, hereinafter referred to as "DIGITAL-S," has been proposed for recording and playback of video signals sampled at 50 Mbps (4:2:2), or twice the SD-DVC rate. This is accomplished by providing two SD-DVC-standard signal processing channels in parallel.

FIG. 3($b$) shows the structure of a basic unit in the DIGITAL-S standard. This basic unit is made up of two units, each of which is equivalent to the basic unit of FIG. 3($a$) without its block Y1 and Y3 data. The reason for this is that although two 4:1:1 signal processing circuits are used, thus constituting an 8:2:2 unit overall, the video signal being processed is a 4:2:2 signal. Therefore, the block Y0, Y1, Cr0, and Cb0 data is placed in areas D0–D3 and A0–A5, and the block Y2, Y3, Cr1, and Cb1 data is placed in areas D4–D7 and A6–A11. The shaded areas V1–V4 are unused areas.

SUMMARY OF THE INVENTION

The present invention was conceived with the above points in mind. Consider, for example, a case such as that described above, wherein the number of recordable chrominance signal pixels is doubled by using two parallel video signal processing circuits. Each of the circuits process the luminance signal and one of the chrominance signals, with a 4:1 ratio between the number of luminance signal pels and the number of chrominance signal pels. It is the object of the present invention to provide, for such situations, a digital video signal method and apparatus that makes effective use of the unused areas of the basic units, as a means of increasing the amount of video information that can be recorded.

To accomplish this objective, the present invention is directed to a digital video signal recording system having two parallel record signal processing channels for recording a first video signal made up of a luminance signal and two chrominance signals and wherein the ratio between the number of pels in the luminance signal and the number of pels in each chrominance signal of the first video signal is m:1, where m is an integer equal to 2 or more. A second video signal is recorded wherein the ratio between the number of pels in the luminance signal and the number of pels in each chrominance signal of the second video signal is m:2. The second video signal has video data in an active pel range and outside of the active pel range. The digital video signal recording system includes record processing means utilizing a macro block formed by combining preselected pel blocks of the luminance signal of the second video signal and preselected blocks of the chrorninance signals of the second video signal. The macro block has areas empty of any video data. The record processing means includes means for compressing a video signal made up of video data outside of the active pel range of the second video signal and means for inserting the compressed video signal into the areas of the macro block empty of any video data for recording on a recording medium.

In a further embodiment, the present invention includes a digital video signal playback system for playing back a video signal recorded on a recording medium by the system noted above. The playback system includes means for extracting the compressed video signal in order to playback a video signal consisting of data from outside of an active pel range of the second video signal.

In still another embodiment, the present invention is directed to a digital video signal recording and playback system having two parallel record signal processing channels for recording and playing back a first video signal made up of a luminance signal and two chrominance signals. The ratio between the number of pels in the luminance signal and the number of pels in each chrominance signal of the first video signal is m:1, where m is an integer equal to 2 or more. A second video signal is recorded wherein the ratio between the number of pels in the luminance signal and the number of pels in each chrominance signal of the second video signal is m:2. The second video signal has video data in an active pel range and outside of the active pel range. The digital video signal recording and playback system includes record processing means utilizing a macro block formed by combining preselected pel blocks of the luminance signal of the second video signal and preselected blocks of the chrominance signals of the second video signal. The macro block has areas empty of any video data. The record processing means includes means for compressing a video signal made up of video data outside of the active pel range of the second video signal and means for inserting the compressed video signal into the areas of the macro block empty of any video data for recording on a recording medium. The system further includes a playback processing means for extracting the compressed video signal in order to playback a video signal consisting of data from outside of an active pel range of the second video signal.

The present invention also includes a method of recording a first and a second video signal, each of the video signals having a luminance signal and two chrominance signals. The ratio between the number of pels in the luminance signal and the chrominance signals of the first video signal being m:1, where m is an integer equal to 2 or more. The ratio between the number of pels of the luminance signal and the chrominance signals of the second video signal being m:2. The second video signal having video data both inside and outside of an active pel range. The method includes the steps of forming a macro block by combining preselected pel blocks of the luminance signal of the second video signal and preselected blocks of the chrominance signals of the second video signal. The macro block has areas empty of any video data. A further step is compressing a video signal made up of video data outside of the active pel range of the second video signal. Further steps include inserting the compressed video signal into the areas of the macro block empty of any video data, and recording on a recording medium.

BRIEF DESCRIPTION OF THE DRAWINGS

The above and other objects, features, and advantages of the present invention will become more apparent from the following detailed description taken with the accompanying drawings, in which:

FIGS. 2(a) and 2(b), is a block diagram showing the internal configurations of two of the blocks shown in FIG. 1.

DESCRIPTION OF THE PREFERRED EMBODIMENTS

Figure 1:
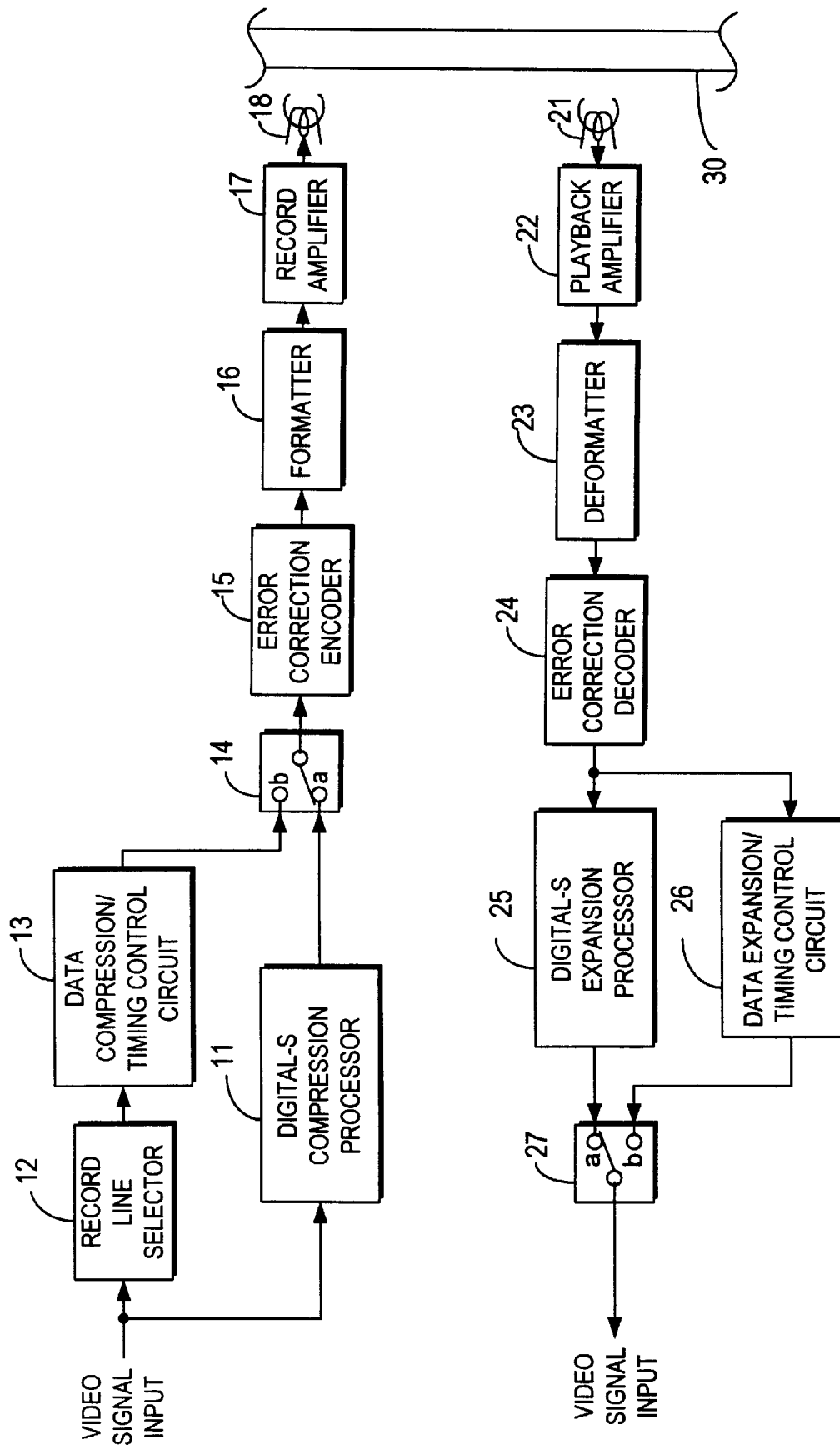
FIG. 1 is a block diagram showing the configuration of the essential portions of the digital video signal recording and playback system in one embodiment of the present invention.

An embodiment of the present invention is described below, with reference to the drawings. FIG. 1 is a block diagram showing the configuration of the essential portions of the digital video signal recording and playback system in one embodiment of the present invention.

The record channel will be described first. The input signal is a digital video signal sampled at a ratio of 4:2:2. The luminance signal has 720 active pels in the horizontal direction and 480 active lines in the vertical direction, and the Cr and Cb chrominance signals each have 360 active pels in the horizontal direction and 480 active lines in the vertical direction.

Figure 3A:
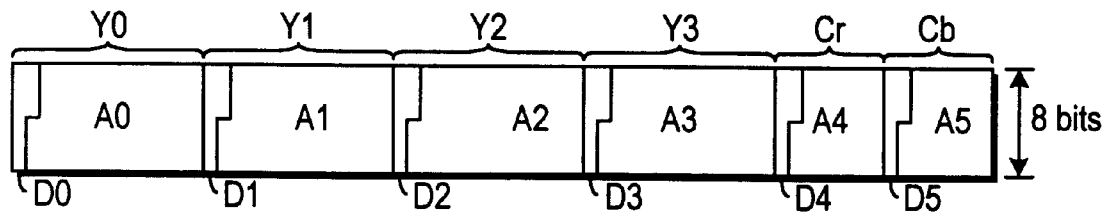
FIGS. 3(a) and 3(b), is a drawing to accompany the description of basic units for video signal recording.
Figure 3B:
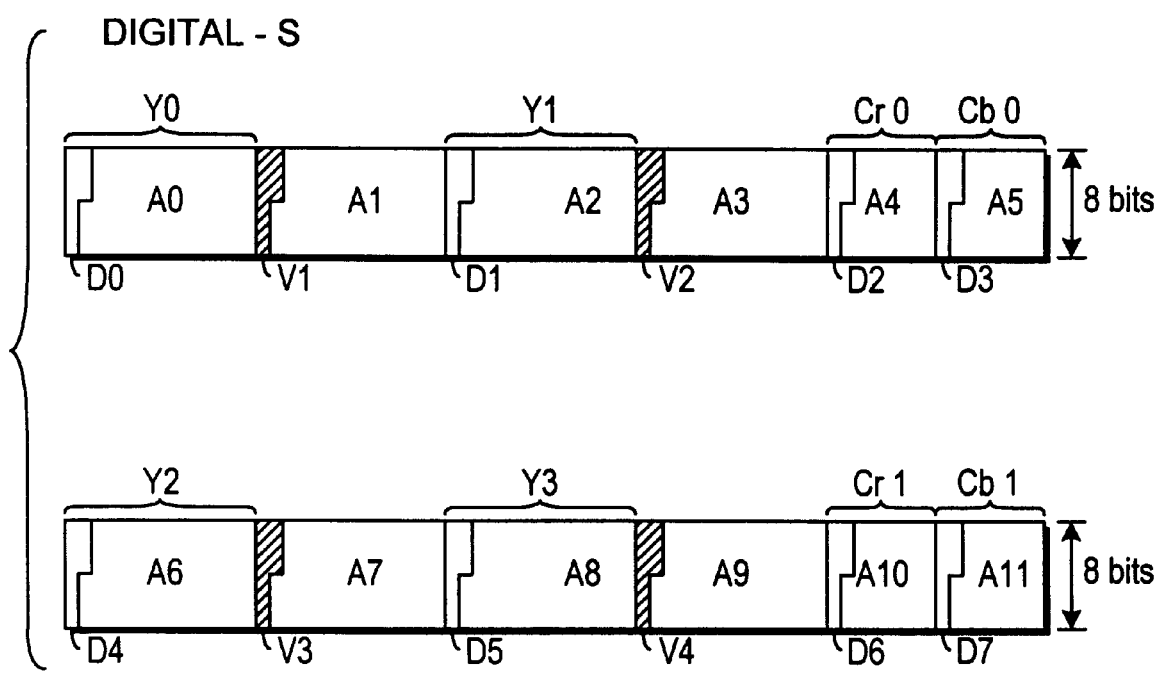

This digital video signal is supplied as an input to a record line selector 12 and a DIGITAL-S compression processor 11. The DIGITAL-S compression processor 11 processes this signal in two parallel processing channels to compress the data for recording in accordance with the SD-DVC standard. The compression processor 11 provides its compressed data output to the "a" side of a switching circuit 14. During processing by compression processor 11, code volume control is applied such that the volume of the resulting compressed data will not exceed a prescribed number of "video segments," where one "video segment" is made up of five of the basic units of FIG. 3(b).

The record line selector 12 operates in response to instructions entered at a control panel (not shown) by the user, to select a line that is outside the range of active vertical lines. It feeds the video data of this selected line to the input of a data compression/timing control circuit 13. Data compression/timing control circuit 13 compresses the data of the selected line, and controls timing to insert this compressed data in the areas V1–V4 of FIG. 3(b) for output to the pin "b" input of the switching circuit 14. Switching circuit 14 is controlled to select its "b" input only during time periods that correspond to areas V1–V4. The remainder of the time it is held in the "a" side position, as shown in the drawing. The output of the switching circuit 14 is applied to the input of an error correction encoder 15.

The error correction encoder 15 performs an error correction coding process to add a predetermined error correction code, and applies its processed data output to the input of a formatter 16. The formatter 16 performs processing to add sync words to the input data and organize it into sync blocks. The resulting output of the formatter 16 is fed through a record amplifier 17 and a magnetic head 18 to be recorded on magnetic tape 30.

FIG. 2(a) is a block diagram showing a possible internal configuration for the data compression/timing control circuit 13 of FIG. 1. As shown in FIG. 2(a), the data compression/timing control circuit 13 is made up of a 4:2:2-to-4:1:1 conversion circuit 42, an SD-DVC data compression processor 43, and a timing control circuit 44. The 4:2:2-to-4:1:1 conversion circuit 42 halves the number of chrominance signal pixels to convert the 4:2:2 video signal to a 4:1:1 video signal, which it then supplies to the input of the SD-DVC data compression processor 43. SD-DVC data compression processor 43 performs an SD-DVC-standard compression process, and inputs the resulting processed data to the timing control circuit 44. The timing control circuit 44 temporarily stores this input data in a buffer memory; then times the output of this data to coincide with time periods corresponding to the above V1–V4 areas.

In the embodiment as described above, video data for lines other than the active lines is inserted in the areas V1–V4 (not used in the DIGITAL-S system), and then recorded on tape. Accordingly, effective use is made of the unused areas in order to increase the number of lines that can be recorded. Each of the areas V1–V4 contains 12 bits. Therefore, if all of these areas were used, it would be possible to increase the recordable data capacity by as much as 1.944 Mbps (12 bits×4 blocks×5 units×270 video segments×30 frames/sec).

Referring again to FIG. 1, the playback channel will be described. Data picked up from magnetic tape 30 by a magnetic head 21 is amplified by a playback amplifier 22 and applied to the input of a deformatter 23. The deformatter 23 detects the sync words, deformats the data, and sends the resulting processed data to an error correction decoder 24. The error correction decoder 24 uses error correction code to perform an error correction process, and inputs the resulting processed data to a DIGITAL-S data expansion processor 25, and a data expansion/timing control circuit 26.

The DIGITAL-S data expansion processor 25 performs processes that are the reverse of those performed during recording (variable length decoding, dequantization, and inverse DCT), and applies the resulting processed data to the "a" input of a switching circuit 27. The data expansion/timing control circuit 26 extracts the data contained in areas V1–V4, performs an expansion process on that data (a process that is the reverse of the compression process performed on it when it was recorded), and inputs the resulting processed data to the "b" side of the switching circuit 27. The switching circuit 27 selects the signal on its "b" input only during the periods corresponding to the line (outside of the range of active lines) that was selected during recording, and is held in its "a" position at all other times. The signal selected for output from the switching circuit 27 is output from the system as the playback video signal.

FIG. 2(b) is a block diagram showing an internal configuration for the data expansion/timing control circuit 26 of FIG. 1. As shown in FIG. 2(b), the data expansion/timing control circuit 26 is made up of a timing control circuit 51, an SD-DVC data expansion processor 52, and a 4:1:1-to-4:2:2 conversion circuit 53. From its input signal, the timing control circuit 51 extracts only the data in areas V1–V4, and stores this data in a buffer memory to be output to the SD-DVC data expansion processor 52 under timing control. The SD-DVC data expansion processor 52 performs processing that is the reverse of that performed during recording, and provides the resulting processed data as an input to the 4:1:1-to-4:2:2 conversion circuit 53. The 4:1:1-to-4:2:2 conversion circuit 53 converts the 4:1:1 video signal it receives at its input to a 4:2:2 video signal at its output. It accomplishes this by adding, for example, the same chrominance data as that in the playback signal.

Thus, as described above, data contained in areas V1–V4 is extracted and expanded by data expansion/timing control circuit 26, thereby recovering the original video data of lines outside of the active line range, for output as playback data, along with the video data in the active lines.

Moreover, the data compression process of data compression/timing control circuit 13 of FIG. 2(a) is not limited to DCT. Hadamard transformation may also be used, as may a scheme that simply reduces the number of bits in the data. When this is done, of course, the data expansion/timing control circuit 26 in the playback channel would be configured to perform a process corresponding to that performed during recording.

Also, in the embodiment described above, the VTR system records and plays back video signals of 525/60 systems. For 626/50 systems (in PAL-compatible systems, for example), the DIGITAL-S standard data unit is 8:2:2, which also includes empty spaces V1–V4. Thus in these systems as well, the empty space can be used for recording and playback of video data of lines other than the active lines, the same as was done in the above embodiment. In this case, however, the 4:2:2-to-4:1:1 conversion circuit 42 and 4:1:1-to-4:2:2 conversion circuit 53 of FIG. 2(b), would become 4:2:2-to-4:2:0, and 4:2:0-to-4:2:2 conversion circuits, respectively.

In the 625/50 system, a sampling ratio of 4:2:0 is used, but since the chrominance signals (Cr and Cb) are switched between alternate lines, the ratio between the number of luminance signal pels and the number of pels in each chrominance signal is 4:1, the same as in the 525/60 system, which is sampled at 4:1:1.

In general, any time two parallel signal processing channels for recording and playing back digital video signals in which the ratio between the number of pels in the luminance signal and the number of pels in each chrominance signal (YC pel ratio) is m:1 (where m is an integer of 2 or greater) are provided in order to provide the capability to record and play back digital video signals having a YC pel ratio of m:2; empty space will be created in the areas in which the dc component of the luminance signal is contained, and it will therefore be possible to make effective use of this empty space, as described above.

As described above, according to the present invention, when signal processing is performed with a macro block comprising prescribed blocks of pels of the luminance signal and prescribed blocks of pels of the chrominance signals of the second video signal, referred to above as the basic unit, the video signal outside of the active pel range of this second video signal is compressed and inserted in vacant space within the above basic unit, and is recorded on a recording medium, along with the video signal in the active range. Therefore, the amount of video data that can be recorded can be increased by making effective use of the empty space within the basic unit.

Various modifications will become possible for those skilled in the art after receiving the teachings of the present disclosure without departing from the scope thereof

What is claimed is:

1. A digital video signal recording system having two parallel record signal processing channels for recording a first video signal made up of a luminance signal and two chrominance signals and wherein the ratio between the number of pels in said luminance signal and the number of pels in each chrominance signal of said first video signal is m:1, where m is an integer equal to 2 or more and recording a second video signal wherein the ratio between the number of pels in the luminance signal and the number of pels in each chrominance signal of said second video signal is m:2, said second video signal having video data in an active pel range and outside of said active pel range, said digital video signal recording system comprising:

record processing means utilizing a macro block formed by combining preselected pel blocks of the luminance signal of said second video signal and preselected blocks of said chrominance signals of said second video signal, said macro block having areas empty of any video data, said record processing means including means for compressing a video signal made up of video data outside of said active pel range of said second video signal and means for inserting the compressed video signal into said areas of said macro block empty of any video data and recording said macro block with said compressed video signal on a recording medium.

2. A system, as claimed in claim 1, wherein said means for compressing said video signal comprises:

a 4:2:2-to-4:1:1 conversion circuit, an SD-DVC data compression processor, and a timing control circuit for controlling the timing of insertion of said compressed video signal into said areas empty of any video data.

3. A digital video signal recording and playback system having two parallel record signal processing channels for recording and playing back a first video signal made up of a luminance signal and two chrominance signals and wherein the ratio between the number of pels in said luminance signal and the number of pels in each chrominance signal of said first video signal is m:1, where m is an integer equal to 2 or more and recording a second video signal wherein the ratio between the number of pels in the luminance signal and the number of pels in each chrominance signal of said second video signal is m:2, said second video signal having video data in an active pel range and outside of said active pel range, said digital video signal recording and playback system comprising:

record processing means utilizing a macro block formed by combining preselected pel blocks of the luminance signal of said second video signal and preselected blocks of said chrominance signals of said second video signal, said macro block having areas empty of any video data, said record processing means including means for compressing a video signal made up of video data outside of said active pel range of said second video signal and means for inserting the compressed video signal into said areas of said macro block empty of any video data and recording said macro block with said compressed video signal, on a recording medium; and a playback processing means for extracting said compressed video signal in order to playback a video signal consisting of data from outside of an active pel range of said second video signal.

4. A system, as claimed in claim 3, wherein said playback processing means includes a data expansion/timing control circuit.

5. A method of recording a first and a second video signal, each of said video signals having a luminance signal and two chrominance signals, the ratio between the number of pels in said luminance signal and said chrominance signals of said first video signal being m:1, where m is an integer equal to 2 or more, the ratio between the number of pels of said luminance signal and said chrominance signals of said second video signal being m:2, said second video signal having video data both inside and outside of an active pel range, said method comprising the steps of:

forming a macro block by combining preselected pel blocks of the luminance signal of said second video signal and preselected blocks of said chrominance signals of said second video signal, said macro block having areas empty of any video data;

compressing a video signal made up of video data outside of said active pel range of said second video signal;

inserting the compressed video signal into said areas of said macro block empty of any video data; and recording said macro block with said compressed video signal on a recording medium.

6. A method of playing back a video signal recorded on a recording medium by the method of claim 5, comprising the steps of:

extracting said compressed video signal in order to playback a video signal consisting of data from outside of an active pel range of said second video signal.

* * * * *